United States Patent [19]

Knoll et al.

[11] Patent Number: 5,758,900
[45] Date of Patent: Jun. 2, 1998

[54] PROTECTION SYSTEM FOR A DRIVER OF A COMPETITION VEHICLE

[75] Inventors: Heinz Knoll, Stuttgart; Manfred Müller, Deizisau; Ulrich Tschäschke, Ehningen; Wolfgang Fischer, Leinfelden-Echterdingen; Frank Zerrweck, Stuttgart, all of Germany

[73] Assignee: Mercedes-Benz AG, Stuttgart, Germany

[21] Appl. No.: 746,503

[22] Filed: Nov. 12, 1996

[30] Foreign Application Priority Data

Nov. 9, 1995 [DE] Germany ............ 195 41 779.8

[51] Int. Cl.⁶ ............................................. B60R 21/18
[52] U.S. Cl. ............................... 280/733; 280/730.1
[58] Field of Search .......................... 280/733, 730.1

[56] References Cited

U.S. PATENT DOCUMENTS

| | | | |
|---|---|---|---|
| 3,865,398 | 2/1975 | Woll | 280/733 |
| 3,905,615 | 9/1975 | Schulman | 280/733 |
| 5,039,035 | 8/1991 | Fitzpatrick | 280/730.1 |
| 5,133,084 | 7/1992 | Martin | 280/730.1 |
| 5,162,006 | 11/1992 | Yandle, II | 280/733 |
| 5,259,070 | 11/1993 | De Roza | 280/730.1 |
| 5,282,648 | 2/1994 | Peterson | 280/733 |
| 5,287,562 | 2/1994 | Rush, III | 280/730.1 |

FOREIGN PATENT DOCUMENTS

| | | |
|---|---|---|
| 3740455A1 | 6/1989 | Germany . |
| 4234228C1 | 4/1994 | Germany . |
| 4306528A1 | 9/1994 | Germany . |

*Primary Examiner*—Kenneth R. Rice
*Attorney, Agent, or Firm*—Evenson McKeown Edwards & Lenahan, PLLC

[57] ABSTRACT

A protection system for a competition vehicle for a competition vehicle driver has shoulder belt parts provided with one shoulder air bag respectively which can be inflated within fractions of seconds and can be emptied again in an energy consuming manner. In the inflated condition, the shoulder air bags are supported on the driver's shoulder regions and support a protective helmet from below against a lateral tilting.

15 Claims, 2 Drawing Sheets

1

PROTECTION SYSTEM FOR A DRIVER OF A COMPETITION VEHICLE

BACKGROUND AND SUMMARY OF THE INVENTION

This invention relates to a protection system for a driver of a competition vehicle having a safety belt arrangement which—relative to the driving direction of the competition vehicle—is anchored firmly to the vehicle at a distance behind a seat position of the driver and which has two shoulder belt parts which, in the worn condition, extend in the manner of suspenders along the shoulder regions at both sides of the driver's head equipped with a protective helmet.

For protecting the driver of a competition vehicle, it is known to equip the driver, on the one hand, with a protective helmet and, on the other hand, to assign to the driver's seat position a safety belt arrangement in the form of a so-called "suspender belt". This safety belt arrangement has two shoulder belt parts which are anchored firmly to the vehicle at a distance behind the seat position and extend along both shoulder regions of the driver to the driver's pelvic region toward the front and downward. The safety belt arrangement is supplemented by additional belt parts in the pelvic and crotch area.

It is an object of the invention to provide a protection system of the initially mentioned type which provides an improved accident protection to the driver of the competition vehicle.

This object is achieved according to preferred embodiments of the invention in that the shoulder belt parts are provided with one shoulder air bag respectively which can in each case be inflated within fractions of seconds and can be emptied again in an energy-consuming manner, in which case, in the inflated condition, each shoulder air bag has an oblong shape with a maximal diameter which is approximately equal to the distance of a lower edge of the protective helmet from the corresponding shoulder region of the driver so that it supports the protective helmet against a lateral tilting. The solution according to the invention protects particularly the driver's cervical spine in an effective manner. By means of the shoulder air bags, a lateral tilting of the protective helmet is avoided, whereby an overstretching of the neck region or an injury of the driver's cervical spine is avoided. The shape of the two shoulder air bags which is adapted to the distance between the shoulder regions and the lower edge of the protective helmet ensures that, when the shoulder air bags are triggered, the protective helmet is not pressed so far upwards that an overstretching of the neck region takes place. During the triggering of the belt force limiting device, the shoulder air bags provide an operative connection between the upper body and the protective helmet, that is, the driver's head, because the shoulder air bags support the lower edge of the protective helmet in a force-locking manner and are supported in the downward direction on the driver's shoulder regions.

As a further development of the invention, each shoulder air bag is placed by means of a holding device on the respective shoulder belt part. As a result, safety belt arrangements already mounted in corresponding vehicles can subsequently be equipped with the shoulder air bags.

In a further development of the invention, each shoulder air bag flanks in its inflated protective position the driver's neck below the protective helmet such that a tilting of the protective helmet toward the side is prevented. As a result, advantageously in connection with a triggering of a steering wheel air bag, a reliable protective system against side impact loads is obtained.

In a further development of the invention, the safety belt arrangement has a belt force limiting device which is firmly linked to the vehicle and which is functionally combined with an air bag installed in a steering wheel of the competition vehicle. As a result, the accident stress is reduced for the driver of the competition vehicle because the safety belt arrangement yields by a certain amount during a frontal impact, whereby the driver is caught in a soft manner and is protected by the air bag of the steering wheel. Therefore, by means of this further development, in addition to benefitting from the effective accident protection during lateral impact stresses, the driver benefits from an increased protection during impact stresses in the driving direction. The belt force limiting device ensures a defined displacement of the driver's upper body and head toward the front. The amount of the restraining force of the belt limiting device is thus adapted to the proportional body mass of the driver so that, on the one hand, a sufficient restraining force and, on the other hand, an energy-reducing displacement toward the front is achieved. In addition to representing a protection in the case of side impact stresses, this development also represents a protection in the case of frontal impact stresses. In order to also improve the protection in the case of rear impact stresses, a stable and effective headrest is provided at the level of the protective helmet.

Other objects, advantages and novel features of the present invention will become apparent from the following detailed description of the invention when considered in conjunction with the accompanying drawings.

DETAILED DESCRIPTION OF THE DRAWINGS

Figure 1:
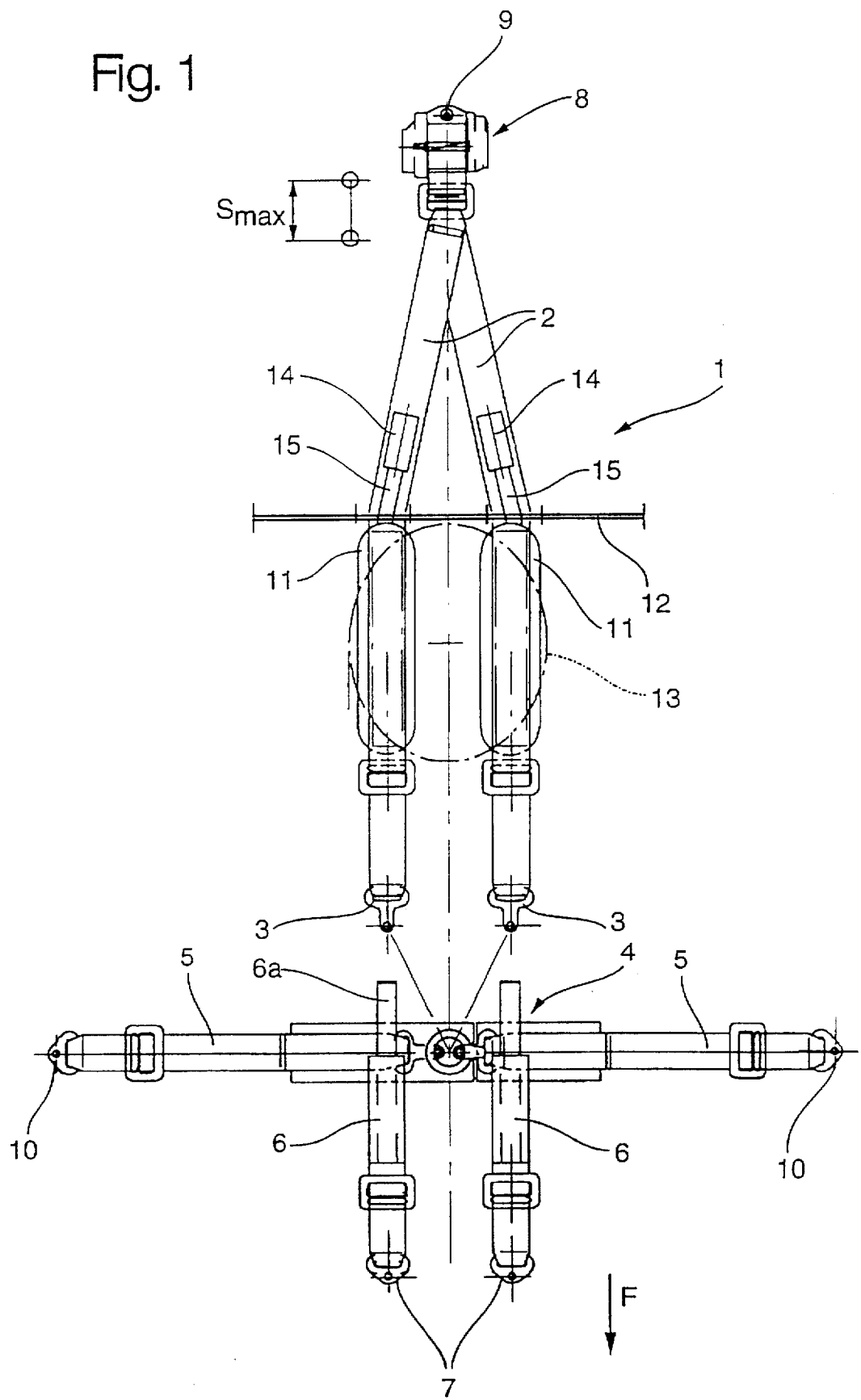
FIG. 1 is a schematic top view of a seat area of a competition vehicle which is provided with an embodiment of a protective system according to the invention.

A competition vehicle, particularly a race car or ralley car, has a seat position for the driver of the competition vehicle in the vehicle interior, to which seat position an embodiment of a protection system according to the invention is assigned which will be described in detail in the following. In a manner which is not shown because it is known per se, an air bag is assigned to the protection system in a steering wheel for steering the competition vehicle. The interaction of this air bag with corresponding functional parts of the remaining protection system will be described in detail in the following.

In addition, a safety belt 1 is assigned to the driver's seat position which has two shoulder belt parts 2. Relative to a normal driving direction (F) of the competition vehicle, the shoulder belt parts 2 are anchored fixedly to the vehicle by means of a fastening point 9 at a distance behind the driver's seat position using a belt force limiting device 8 described in detail in the following. The shoulder belt parts 2 extend along two shoulder regions 16 (FIG. 2) of the driver whose head is protected by a protective helmet 13. In the worn position, the shoulder belt parts 2 extend toward the front and downward into the driver's pelvic area, where they can be latched by means of buckle parts 3 in a central buckle 4. In addition, the safety belt arrangement 1 has two pelvic belt parts 5 which are anchored firmly to the vehicle or seat by means of fastening points 10. The pelvic belt parts 5 are also connected with the central buckle 4. The safety belt arrangement 1 also includes two crotch belt parts 6 which are also anchored firmly to the vehicle or seat at the fastening points 7 and represent the lengthening of the shoulder belt parts in the downward direction. The crotch belt parts 6 are hung by means of loops 6a in the lower ends of the shoulder belt parts 2. The shoulder belt parts 2 have a very low belt strap expansion and, in the worn condition, are tightly pulled so that the driver is pressed firmly against the backrest 12 of the seat position. The belt force limiting device 8 has an essentially progressive characteristic force—path curve.

The belt force limiting device 8 permits a displacement of the safety belt arrangement 1 toward the front by a maximal path ($S_{max}$), in which case the path ($S_{max}$) as well as the amount of the restraining force of the belt force limiting device 8 are coordinated with the inflating of the air bag installed in the steering wheel. By means of the combination of the belt force limiting device 8 and the steering wheel air bag, a suitable energy reduction is provided also in the case of high decelerations of the competition vehicle; that is, in the case of impact stresses along the longitudinal axis of the vehicle defined by the driving direction (F). The thus formed protective system is therefore adapted to frontal impact stresses.

In order to further improve the protection of the driver, two additional shoulder air bags 11 are assigned to the shoulder belt parts 2 at the level of the shoulder regions 16 of the driver, each shoulder air bag being fastened on the shoulder belt 2 by means of a holding device which is not shown. The shoulder air bags 11 each have an inflatable hollow body made of a textile fabric which, in the inflated condition, have an oblong, cylinder-type shape. In this case, the maximal diameter of each hollow body in the inflated condition is approximately equal to the distance of the assigned shoulder region 16 from a lower edge 17 of the protective helmet 13. The length of each hollow body of each shoulder air bag 11 corresponds approximately to the length of the protective helmet 13 relative to the longitudinal axis of the vehicle (FIGS. 2 and 3).

As a result of the fact that the shoulder belt parts 2 and therefore also the hollow bodies of the shoulder air bags 11 extend along the driver's shoulder regions 16, they also extend at a distance below the surrounding lower edge 17 of the protective helmet 13. As soon as the hollow bodies of the shoulder air bags 11 are inflated in the manner described in detail in the following, they are, on the one hand, supported on the shoulder regions 16 and, on the other hand, support the lower edge 17 of the protective helmet 13 from below. As the result of the fact that the two hollow bodies of the shoulder air bags 11 support the protective helmet 13 along its whole length, in the inflated condition of the hollow bodies, tilting movements of the protective helmet 13 toward the sides are prevented. As a result, an effective protection of the neck area and particularly of the cervical spine area of the driver is achieved in the case of lateral impact stresses, during which, without the support by the shoulder air bags 11, the protective helmet 13 would abruptly tilt to the side because of the corresponding mass inertia forces and would cause injury to the cervical spine.

In the embodiment according to FIG. 1, one gas generator 14 respectively is assigned to each hollow body of the shoulder air bag 11, is fastened on the corresponding shoulder belt part 2, and is connected by means of one hose connection respectively with the corresponding hollow body of the shoulder air bag 11. An ignition device is assigned to both gas generators 14 in a manner not shown and is in an operative connection with the steering wheel air bag in order to cause a coordinated triggering of the different protection elements of the protection system.

Figure 2:
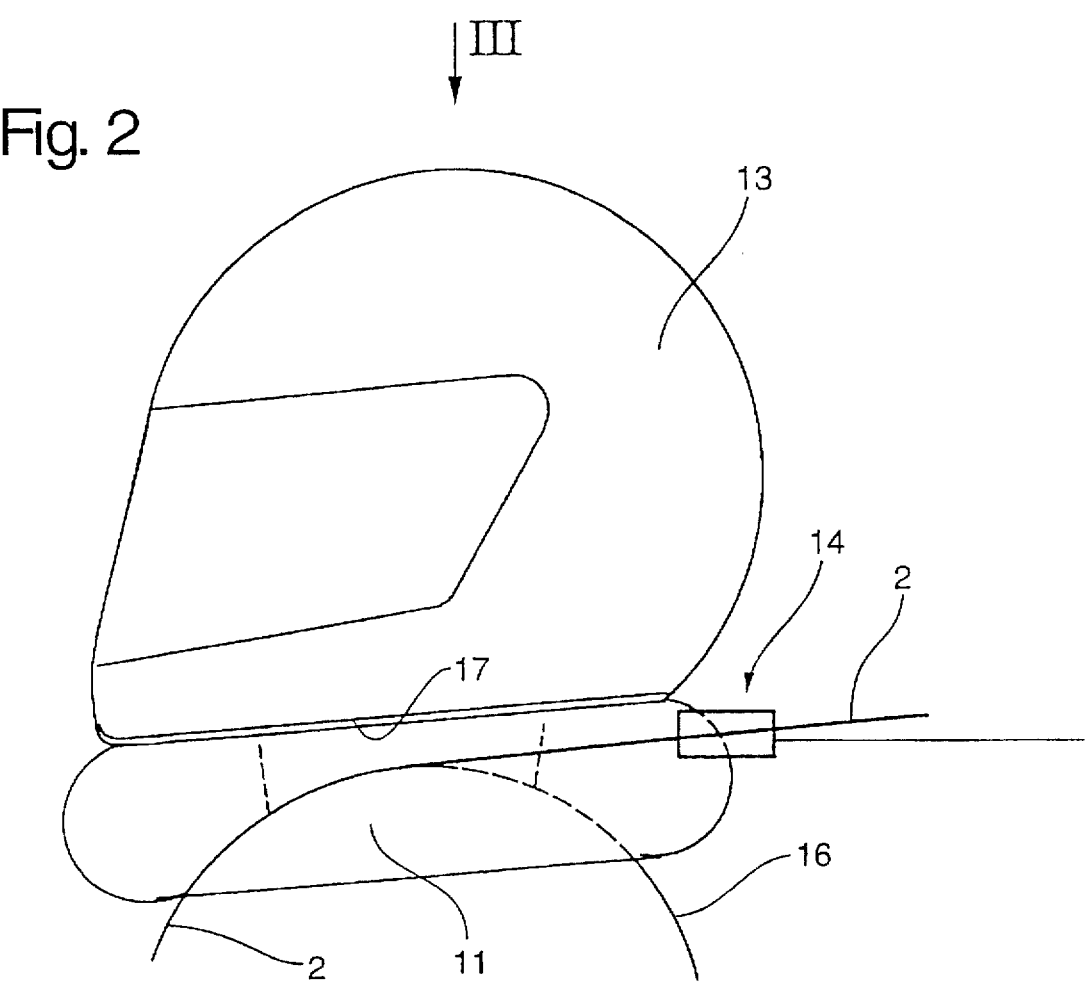
FIG. 2 is a schematic lateral view of a part of a similar protective system according to the invention in the region of the head of a driver of the competition vehicle wearing a protective helmet.
Figure 3:
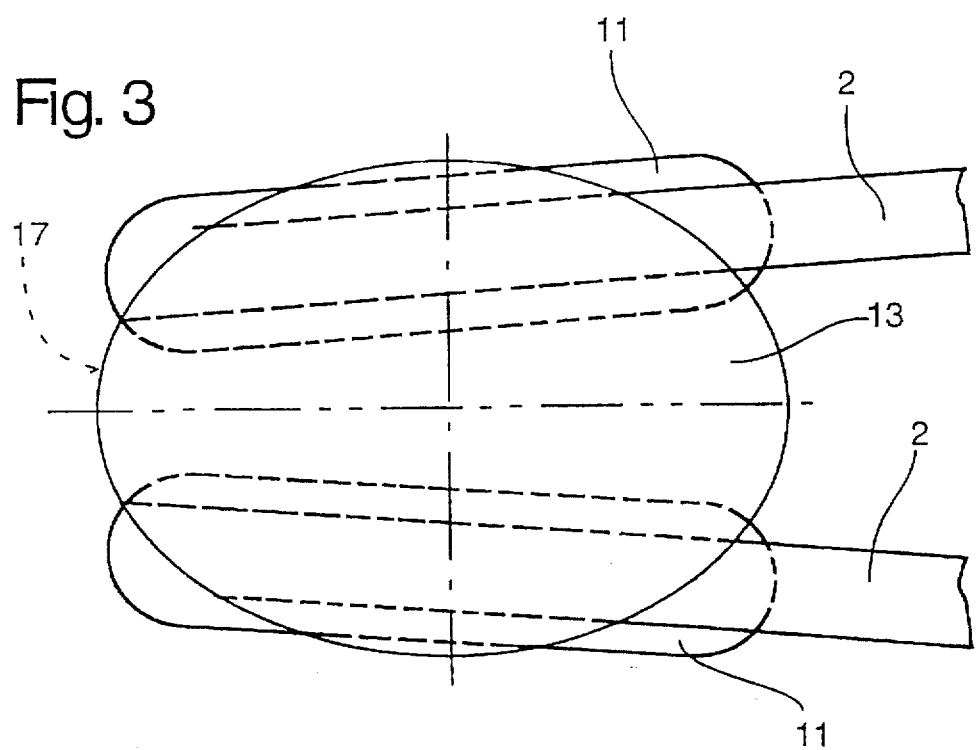
FIG. 3 is a top view of the part of the protective system according to FIG. 2 in the direction of arrow III in FIG. 2.

In the embodiment according to FIG. 2, the gas generator 14 is integrated in the holding device of the shoulder air bag 11 on the shoulder belt part 2 and is directly connected with the corresponding hollow body. With respect to the remaining features, the embodiment according to FIGS. 2 and 3 corresponds to the embodiment illustrated in FIG. 1. Instead of a gas generator, a pressure accumulator can also be used in a manner known per se for each shoulder air bag 11.

In their inflated condition, when the shoulder belt parts 2 are displaced toward the front by the belt force limiting device 8, the two hollow bodies of the shoulder air bags 11 cause a force-locking taking-along of the lower edge of the protective helmet 13 so that the belt force limiting device 8 as well as the two shoulder air bags each develop their full effect. By means of the combination of the three different protection devices, specifically the shoulder air bags 11, the belt force limiting device 8 and the steering wheel air bag, the protection system particularly for the head and the neck area of the driver, in the case of an accident, independently of the direction of the respective impact stress, provides a secure protection in that the shoulder air bags act as support cushions for the protective helmet 13. A tilting of the protective helmet 13 and thus of the driver's head relative to the driver's shoulder regions 16 is effectively prevented by the solution according to the invention.

As an alternative to the arrangement of two gas generators on the shoulder belt parts, it is also possible to install a common gas generator centrally on the rear side of the seat back 12 and connect it by way of hose connections 15 with the shoulder air bags 11.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Protection system for a driver of a competition vehicle having a safety belt arrangement which, relative to the driving direction of the competition vehicle, is anchored firmly to the vehicle at a distance behind a seat position of the driver and which has two shoulder belt parts which, in the worn condition, extend in the manner of suspenders along shoulder regions at both sides of a driver's head equipped with a protective helmet, wherein the shoulder belt parts are equipped with at least one shoulder air bag respectively which, in fractions of seconds, can be inflated and can be emptied again in an energy-consuming manner, each shoulder air bag having an oblong shape in the inflated condition with a maximal diameter which is approximately equal to a distance between a lower edge of the protective helmet and a corresponding shoulder region of the driver so that it supports the protective helmet against a lateral tilting.

2. Protection system according to claim 1, wherein each shoulder air bag is placed on the respective shoulder belt part by means of a holding device.

3. Protective system according to claim 1, wherein each shoulder air bag flanks the driver's neck below the protective helmet in its inflated protective position such that a tilting of the protective helmet toward the side, the front or the rear is prevented.

4. Protection system according to claim 1, wherein the safety belt arrangement has a belt force limiting device which is firmly linked to the vehicle and which is functionally combined with an air bag installed in a steering wheel of the competition vehicle.

5. Protection system according to claim 1, wherein one gas generator respectively is provided for each shoulder air bag and is placed on the corresponding shoulder belt part.

6. Protection system according to claim 2, wherein each shoulder air bag flanks the driver's neck below the protective helmet in its inflated protective position such that a tilting of the protective helmet toward the side, the front or the rear is prevented.

7. Protection system according to claim 3, wherein the safety belt arrangement has a belt force limiting device which is firmly linked to the vehicle and which is functionally combined with an air bag installed in a steering wheel of the competition vehicle.

8. Protection system according to claim 3, wherein the safety belt arrangement has a belt force limiting device which is firmly linked to the vehicle and which is functionally combined with an air bag installed in a steering wheel of the competition vehicle.

9. Protection system according to claim 6, wherein the safety belt arrangement has a belt force limiting device which is firmly linked to the vehicle and which is functionally combined with an air bag installed in a steering wheel of the competition vehicle.

10. Protection system according to claim 2, wherein one gas generator respectively is provided for each shoulder air bag and is placed on the corresponding shoulder belt part.

11. Protection system according to claim 3, wherein one gas generator respectively is provided for each shoulder air bag and is placed on the corresponding shoulder belt part.

12. Protection system according to claim 4, wherein one gas generator respectively is provided for each shoulder air bag and is placed on the corresponding shoulder belt part.

13. Protection system according to claim 6, wherein one gas generator respectively is provided for each shoulder air bag and is placed on the corresponding shoulder belt part.

14. A motor vehicle passenger protection system comprising:

a helmet, a safety belt harness including shoulder straps, and shoulder air bags arranged to have an expanded maximal dimension approximately equal to a distance between an abutment section on the helmet and a shoulder region of the passenger to thereby support the helmet against lateral tilting.

15. A protection system according to claim 14, comprising a shoulder air bag actuation system operably coupled to a vehicle steering wheel air bag actuation system.

* * * * *